United States Patent [19]

Virkar

[11] Patent Number: 4,677,009

[45] Date of Patent: Jun. 30, 1987

[54] CERAMIC BODIES HAVING A PLURALITY OF STRESS ZONES

[75] Inventor: Anil V. Virkar, Salt Lake City, Utah

[73] Assignees: Ceramatec, Inc., Salt Lake City, Utah; The Dow Chemical Company, Midland, Mich.

[21] Appl. No.: 792,480

[22] Filed: Oct. 29, 1985

Related U.S. Application Data

[63] Continuation-in-part of Ser. No. 665,912, Oct. 29, 1984.

[51] Int. Cl.$^4$ .............................................. B05D 3/02
[52] U.S. Cl. .................................. 428/36; 427/376.2; 427/376.3; 427/404; 427/419.1; 427/419.2; 428/375; 428/388; 428/389; 428/426; 428/428; 428/432; 428/433
[58] Field of Search ............... 428/426, 428, 432, 433, 428/36, 375, 388, 389; 427/376.2, 376.3, 404, 419.2, 419.1

[56] References Cited

U.S. PATENT DOCUMENTS 3,953,636  4/1976  Kirchner .............................. 428/155

Primary Examiner—Theodore E. Pertilla
Attorney, Agent, or Firm—Trask, Britt & Rossa

[57] ABSTRACT

Ceramic bodies having a balanced overall stress pattern in which are present individual stress zones of compressive and tensile stresses and the techniques for forming said bodies are disclosed. The bodies are formed by having slightly different compositional patterns from one zone to another whereby during cooling there is a differential volumetric expansion or contraction in one zone as compared to an adjacent zone. The volumetric expansion or contraction is caused by a material which undergoes a phase transformation during the cooling from the sintering temperatures utilized to sinter the ceramic body, whereby such phase transformation is accompanied by a volumetric change.

19 Claims, No Drawings

CERAMIC BODIES HAVING A PLURALITY OF STRESS ZONES

RELATED APPLICATIONS

This application is a continuation-in-part of U.S. patent application Ser. No. 665,912 filed Oct. 29, 1984, entitled "Ceramic Bodies Having a Plurality of Stress Zones" by Anil Virkar.

BACKGROUND OF THE INVENTION

1. Field

The instant invention relates to ceramics strengthened through the inclusion of one or more compressive stress zones within a ceramic body.

2. State of the Art

The strengthening of materials which fail primarily in tension by the introduction of compressive stress zones within the body is well known in the field of glasses. Compressive stresses have been introduced into the surface areas of glass for a long time by the technique of thermal tempering wherein the surface of the glass is cooled rapidly while the glass is quite hot. At the temperatures involved in thermal tempering, the glass is sufficiently fluid that the surfaces may be cooled rapidly, and in effect frozen to a particular dimensional state. Later, as the center portion of the glass cools, it wants to contract; however it is restrained to the dimensional state established by the outer layers of the glass body. This tendency to shrink by the inner portion of the glass places the outer zones of the glass in compression and the inner zone in tension. The tensile strength of the glass is generally improved by such techniques.

Similar techniques have been used in glass through the technique of ion exchange strengthening whereby large ions, such as potassium or sodium, are substituted in the surface of the glass in place of smaller ions, such as sodium or lithium, respectively. The overall effect is again to place the surface layers of the glass in compression which is balanced by an inner zone in tension so that the overall stress exhibited by the body is balanced. Techniques somewhat similar to this have been utilized in glass ceramics.

Classical ceramic bodies such as those which are oxides, carbides or nitrides of metals such as aluminum, berillium, silicon, titanium, zirconium and the like are formed into rigid bodies in a manner much different than that of glass. Ceramic bodies are generally crystalline while a "glass" body is typically amorphous, that is, noncrystalline, and is frequently considered to be a super-cooled liquid. Typically, in the formation of glasses and even of glass ceramics, at some stage in the processing a temperature is reached wherein the material is liquid or molten.

In the typical processing of ceramic bodies, no liquid condition is reached for all the components. Typically, a ceramic is formed by preparing a body of powdered material, such as aluminum oxide, and then forming it into some shape such as a tube, plate, bar, or other shape by slip-casting, powder-pressing, electrophoretic deposition, or other green-forming techniques. At one stage in such processing, the ceramic body is characterized as being in a green state, that is, the ceramic powders exist as a body in some physical shape and have some small strength provided by a binder or other means within the body. At this stage, the body is in form for firing or sintering whereby the body is fired to a temperature wherein mass diffusion occurs and the body becomes rigid and strong upon cooling. Such ceramic bodies, while having many advantages in terms in their refractoriness, are generally considered brittle, and generally fail in tension, even when subjected to compressive forces. The failure is generally due to tensile contact stresses.

Such ceramics generally have surface flaws which are often the sources of stress concentration and become sites of initiation of crack propogation which brings about ultimate failure of the ceramic body. One technique which has been utilized to strengthen such bodies is that of transformation toughening wherein certain crystalline materials are present metastably in the ceramic body in one crystal phase, for example, zirconia in the tetragonal crystal phase in the presence of a high stress field martensitically transformes into a monoclinic crystal which has a larger volume. This has been demonstrated in the art to terminate or retard the propogation of an existing crack, making the ceramic body tougher.

In recent work by Green, a sintered ceramic body of zirconia was heat treated to cause thermal diffusion of the stabilizing agent, yttria, to migrate to the surface of the body to depart the body by diffusion into another medium. The surface regions of the body then being depleted in yttria experience a phase transformation of zirconia particles from the tetragonal crystal form to the monoclinic crystal form thereby causing a compressive stress to form in the surface areas of the body because of the increased volume of the monoclinic crystals. Since the overall stress pattern of the body must be neutral, i.e. the stresses must be balanced, a corresponding tensile stress forms in the internal regions of the body.

The technique of Green is effective for forming compressive stresses in surface regions of sintered ceramic bodies. It is, however, somewhat limited as to the depth of compressive stress which can be formed since the operation is dependent upon thermally induced mass diffusion, which is quite slow. Also, because thermal diffusion occurs only at elevated temperatures, other competing phenomena proceed, such as grain growth of various crystals of the ceramic, which may be detrimental to overall strength. Also, there is no ready technique in the procedure of Green for selectively determining those regions in which a compressive stress will be induced.

DESCRIPTION OF THE INVENTION

The instant invention relates to a process and to various articles or products, both in a green state and in a sintered state, which are unique. Sintered bodies having two, three, four or more stress zones may be readily formed by the techniques of this invention. At least one compressive stress zone and at least one tensile stress zone are present. The degree of stress present and the thickness of a given stress layer may be predetermined and may be varied over a broad range. Sintered bodies with surface compressive stress zones may be readily made as well as bodies which have surface tensile stress zones. Also, bodies may be made wherein one surface layer is in compression and an opposed surface layer is in tension.

Bodies of this type in a sintered stage may be formed by varying the chemical composition of various layers or zones within a particular body whereby at least one layer has the ability to undergo volumatic expansion. One such method may be as follows:

1. A first layer of sinterable particles of a certain chemical composition are formed in a desired configuration. This configuration may be accomplished by slip-casing, electrophoretic deposition, or by deposit of a layer of ceramic particles within a mold to be subjected to isostatic pressing.

2. A second layer of sinterable particles of a certain chemical composition different than the first layer is placed adjacent the first layer so that at least one surface of the second layer is co-extensive and contiguous with a surface of the first layer. The chemical composition of the second layer is such that it contains crystals which, upon sintering and cooling, transform to a crystal of a higher size whereby the second layer has a different bulk density or unit weight per bulk volume than that of the first layer. For example, in the second layer, unstabilized zirconia particles may be present whereby, upon sintering of the base ceramic and cooling, the zirconia particles convert from the tetragonal to the monoclinic state, thereby increasing the volume of the second layer in contrast with a first layer composed of stabilized zirconia particles.

3. A green body is formed of the first and second layers of particles. Generally, the green body strength is dependent upon binders and similar "glue" for holding the body together. Occasionally, green bodies may undergo a slight heating to assist in forming the green body. For example, if the green body is formed via slip-casting, it may be desirable to drive out most of the residual water before the sintering step is conducted.

4. Densification of the ceramic through the mass diffusion of atoms within the body.

5. The body is cooled from the sintering temperature which may be in the range of from about 1200° C. to about 2500° C., depending upon the nature of the ceramic body. The body passes through a temperature range which may be a transformation temperature for unstable particles within the ceramic body. For example, the transformation temperature of unstabilized zirconia is about 900° C. for transforming from the tetragonal to the monoclinic state to about 1100° C. for transforming from the monoclinic to the tetragonal state. The transformation temperature range of particles of hafnia, 1300° C. to about 1400° C., and the like may vary from that of zirconia. The transformation of particles within one of the layers will cause a compressive stress to form in one layer and a tensile stress to form in the other layer.

In preparing ceramic powders for utilization in the techniques of this invention, the powders to be used in the compressive zones are preferably sized in the range where transformation to the monoclinic polymorph will occur upon cooling but these transformed grains will not be large enough to cause microcracking. In aluminum-zirconia bodies, this zirconia particle size is estimated to be about 0.5 to about 1.5 microns. The zirconia particle size in the compressive stress region should preferably be such as to transform by cooling through the transformation temperature range. Particles of zirconia and hafnia are well known for their phase transformation characteristics.

The host ceramic body may be practically any ceramic body which does not chemically react with the material undergoing phase transformation, for example, zirconia or hafnia. Also, the technique works best for those ceramic materials which have a high modulus of elasticity, i.e. one preferably higher than zirconia. The host ceramic body may be aluminum oxide, magnesia, spinels (i.e., $MgO\ Al_2O_3$), mullite, titanium carbide, titanium nitride, silicon carbide, silicon nitride, thoria, zinc oxide, and other ceramic materials which can be transformation toughened using zirconia, hafnia. Within the category of alumina should also be included those materials which are aluminates, such as alkali metal aluminates, for example, sodium aluminates, often identified as beta-alumina or beta-alumina.

To induce a compressive stress in the final body, only slight differences in the chemical composition of adjacent layers is required. For example, only a small quantity of unstabilized zirconia need be present in one layer to occasion a significant stress differential between that layer and an adjacent layer when the ceramic body is sintered and cooled. In those instances where zirconia is utilized as the ingredient which undergoes phase transformation, the presence of zirconia as a few weight percent up to about 20 to 30% or more is sufficient to create significant stress differentials between a layer containing unstabilized zirconia and an adjacent layer containing essentially no unstabilized zirconia.

The techniques of this invention may be utilized to form shapes of various physical configurations. For example, plates and tubes may be readily formed. Plates may be formed, for example, wherein all the external surfaces and the regions adjacent the external surfaces are in a state of compressive stress. Tubes may be formed, for example, in which the external surface is in compression and an internal surface is in tension. Bodies of complex shapes may be formed by slip-casting, tape casting, powder-pressing, and the like to have two, three, four or more stress zones.

EXAMPLE 1

A ceramic plate or bar was formed by admixing fine particles of alumina (Reynolds grade 172) with about 15% by weight of zirconia, unstabilized (Harshaw electronic grade), and used for the outside layers of a three-layered composite. The same type of alumina was also mixed with 15% by weight zirconia (Zircar grade containing 2 mole percent yttria as stabilizer) was used in the center of the composite. The composite thickness was approximately 6000 microns and the outer layers of various bars were prepared with thicknesses varying between about 500 and 2000 microns. The composite structure was prepared by isostatic pressing so that no delamination occurred upon pressureless sintering at 1625° C. for a period of one hour. The density of the sintered alumina-zirconia composites were generally about 98% of theoretical. Optical microscopy examination of a polished cross-section showed no evidence of a boundary layer. Also, x-ray diffraction showed that the inside layer was about 60% cubic crystals and about 40% tetragonal crystals, while the outer layers were about 56% monoclinic and about 44% tetragonal. For control purposes, a bar of similar dimensions was prepared in which the whole body had the same composition as the outer layers and was sintered in the same manner. Strength examination, four-point bending test, of the control material yielded a strength of 47 ksi. The composites with an outside layer thickness of 500 microns had a strength of 73 ksi while the 1000 micron thick outer layer composites had a mean strength of 68 ksi, and the composites with an outer layer thickness of 2000 microns broke at 61 ksi in bending mode.

EXAMPLE 2

Alumina-zirconia powder consisting of 15 weight percent (10 mole percent zirconia) was prepared by ball milling Reynold's HP-DBM $Al_2O_3$ (High Purity Dry Ball Milled Alumina) with Daiichi DK-1 $ZrO_2$ in cyclohexane with zirconia balls for 12 hours. The zirconia particle size was mainly (70%) between 0.5 and 1.5 microns as determined by the sedigraph technique. The alpha alumina was approximately 0.5 microns in diameter. The powder was air dried and screened −170 mesh (U.S. Standard). A second powder was prepared in an identical manner except the Daiichi zirconia was replaced by Toyo Soda's TZ-3Y submicron zirconia powder which was partially stabilized with three mole percent yttria. A rectangular bar-shaped die was first filled with the $Al_2O_3$-15$ZrO_2$ powder, then an appropriate amount of $Al_2O_3$-15$ZrO_2(Y_2O_3)$, and finally more $Al_2O_3$-15$ZrO_2$ before uniaxially pressing bars at 20 MPa. The resulting composite was a three-layered bar. The uniaxially pressed bars were isostatically pressed at 200 MPa and pressureless sintered at 1590° C. for one hour. The sintered bars had a density of 4.16 g/cc and dimensions of approximately 6 mm thick by 10 mm wide by 50 mm long. The outside layer was adjusted so as to make bars with a surface layer of 0, 250, 500, and 1000 microns on both sides of the sandwich while retaining the 6 mm overall thickness. The sintered bars were chamfered lightly on the edges to eliminate any chips using a 30 micron diamond wheel. The bars were tested in four point bending using a universal testing machine with a controlled displacement of 0.5 cm/min and inner and outer spans of 0.95 and 3.18 cm respectivley. The fracture strengths for the three-layered composites are compared with the standard material set forth in Table 1. In all cases, the compressive residual stresses in the outer layer of the three-layered composites increased the strength substantially. The apparent fracture toughness was measured using a 136 degree Vicker's indentor at loads between 100 and 400 Newtons. The determination of fracture toughness was based on the technique described by Evans and Charles in the *Journal of the American Ceramic Society* (Vol. 59, p. 371, 1976). As displayed in Table 1, the apparent fracture toughness also increases due to the compressive residual stresses. The increase in strength and toughness is explained by the phase difference between the inner and outer layers. X-ray diffraction showed that the inner material consisted of tetragonal zirconia, while the outer layers contained equal amounts of the monoclinic and tetragonal polymorphs.

TABLE 1
Strength and Apparent Toughness Data

| Code | Outer Layer Thickness (Mm) | Strength (MPa) x | s | % Increase | Apparent Fracture Toughness (MPA$\sqrt{m}$) x | s | % Increase |
|---|---|---|---|---|---|---|---|
| Standard | 0 | 510 | 24 | — | | | |
| 3-layer | 250 | 646 | 113 | 26.7 | | | |
| 3-layer | 500 | 650 | 42 | 27.5 | | | |
| 3-layer | 1000 | 712 | 48 | 39.6 | | | |

EXAMPLE 3

Three-layer composites were fabricated as in Example 2 except that the zirconia content was increased to 20 weight percent (15 mole percent). Upon sintering, the outer layer contained approximately 80% monoclinic and 20% tetragonal while the partially stabilized inner zirconia remained tetragonal. The strength of the three-layer bars was 602 MPa (standard deviation of 106 MPa) as compared to a single-layer bar of identical $ZrO_2$ content which had a strength of 469 MPa (standard deviation of 60 MPa).

EXAMPLE 4

Three-layer composites were fabricated as in Example 2 except that the zirconia content was increased to 25 weight percent. The phase contents of the zirconia in the outer and inner layers was similar to Example 2. The strength of the layered composite was 805 MPa (standard deviation of 70 MPa).

EXAMPLE 5

Three-layer composites were fabricated where the zirconia content varied from the inner to the outer layer in order to incorporate temperature stresses in addition to the transformation-induced stresses. The outer layers of such bars were identical to the outer layers of Example 2 ($Al_2O_3$-15$ZrO_2$) and the inner layer was identical to the inner layer in Example 4 ($Al_2O_3$-25$ZrO_2(Y_2O_3)$). The strength of the composite was 857 MPa (standard deviation of 42 MPa) and the apparent toughness was MPa-m$^{\frac{1}{2}}$. The higher coefficient of thermal expansion of zirconia as compared to alumina resulted in a lower thermal contraction of the outer material as compared to the inner material resulting in additional compressive surface stresses.

EXAMPLE 6

Three-layer composites were made with identical compositions to those described in Example 2 except that the binder (volatile) content was increased to allow the outside material to be tape-cast. The tape-cast layer was bonded to the either multiple tape-cast inner layers (laminated together) or to a uniaxially pressed body. The resulting laminate was isostatically pressed and sintered as described in Example 2. A three-layer composite similar to the one described by the powder processing method resulted through tape-casting.

The technique of causing selective transformation of tetragonal zirconia particles may further be accomplished by regulating or controlling the particle size distribution of zirconia in a ceramic body. Large particles of unstabilized zirconia in the tetragonal form are relatively easily transformed to larger monoclinic particles. A composite ceramic body having very fine zirconia particles in one layer of the body in contrast with larger tetragonal zirconia particles in another portion of the body can be processed at elevated temperatures into a body in which the larger tetragonal zirconia particles convert to the monoclinic phase upon cooling, thereby occupying or attempting to occupy a larger volume for each such particle that undergoes transformation. The finer zirconia particles undergo no transformation, thereby resulting in a body which has one layer or zone in compression, i.e. the one in which the zirconia particles experienced transformation, and another layer or zone in tension.

Zirconia particles in the tetragonal phase, if a size larger than about 0.5 micron, and especially larger than about 1.0 micron, may be transformed to the monoclinic state by subjecting a body containing such particles to a temperature in excess of 1000° C. for a sufficient time to bring about transformation. In contrast, very fine particles of tetragonal zirconia, i.e. particles less than about 0.3 microns, do not readily transform to the monoclinic phase when subjected to time-temperature conditions which initiate trnasformation of larger zirconia particles. The ratio of particle sizes to cause effective selective transformation may range from about 2:1 to about 8:1 or more, with the larger particles typically having a minimum mean thickness of about 0.5 micron and preferably about 1.0 micron.

The host ceramic body may be composed of alumina, magnesia and other sinterable ceramic materials described hereinabove. The particle size of the host ceramic material is unimportant as long as it is within the range of readily sinterable particles.

Using particle size variation, zirconia or hafnia bodies may be made wherein a sintered body has compressive stress zones and tensile stress zones in a body having a uniform chemical composition. Utilizing mixtures of materials, ceramic bodies having a host material which does not chemically react with zirconia or hafnia may include minor quantities of zirconia or hafnia wherein a selective particle size distribution is effected to obtain a sintered body with selective compressive and tensile layers or zones.

This technique has been particularly useful in magnesia bodies, as illustrated in the following example.

EXAMPLE 7

A three-layered magnesia composite containing 20 volume percent unstabilized zirconia was prepared by hot-pressing.

Two zirconia powders with different particle size distributions were employed to obtain an article having two surface compressive stress layers.

The finer $ZrO_2$ powder was prepared by milling unstabilized Harshaw powder with zirconia grinding media for 60 hours. The milled particles had a particle size distribution of about 0.1 to about 1.0 micron with an average of about 0.3 micron.

Coarse zirconia was prepared by annealing the unstabilized Harshaw powder at 1000° C. for three hours and then milling with zirconia grinding media for about 12 hours. The resulting powder had a particle size distribution of about 0.1 micron to about 10 microns with an average of about 3.0 microns.

The coarse and fine unstabilized zirconia powders were separably blended with magnesia, which had been prepared by thermal decomposition of magnesium carbonate. The magnesia was wet milled in a 2% solution of ammonium hydroxide for 2.4 hours to obtain the desired magnesia powder.

The mixtures of magnesia powder with 20 volume percent of zirconia were dried at 200° C. for 24 hours and fine ground to less than 100 mesh.

A three-layered composite was formed by loading a hot-pressing die with MgO containing coarse zirconia particles. Next, a layer of magnesia containing fine $ZrO_2$ particles was added, followed by a layer of magnesia containing coarse zirconia particles.

The sample was hot-pressed at 1300° C. and 4000 psi for about 10 minutes. The resulting article had a bending strength of 526 MPa and a fracture toughness of 7.1 MPa A control sample of magnesia containing 20 volume percent of zirconia without a particle size distribution was prepared in a similar hot-pressed manner. The resulting article has a bending strength of 360 MPa and a fracture toughness of 3.9 MPa$\sqrt{M}$.

EXAMPLE 8

A three-layered body of MgO containing 20% zirconia and 3% MnO was prepared in a manner similar to Example 2. The zirconia used in the center layer was calcia-stabilized while manganese oxide was added to enhance sintering of the magnesia in each of the layers. Conventional sintering was practiced. Strength and density data are tabulated in Table 2.

TABLE 2

Bending Strength of Sintered MgO—$ZrO_2$ Ceramics

| Sample | Composition | Process | Relative Density | Strength MPa | (psi) |
|---|---|---|---|---|---|
| 1 | $MgO/ZrO_2/MnO$ $MgO/ZrO_2/MnO$ (s) | 1350° C./ 4 hrs. | 99.0 | 361 | 53,000 |
| 2 | $MgO/ZrO_2/MnO$ $MgO/ZrO_2/MnO$ (s) | 1350° C./ 4 hrs. | 99.3 | 371 | 54,000 |
| 3 | $MgO/ZrO_2/MnO$ $MgO/ZrO_2/MnO$ (s) | 1300° C./ 4 hrs. | 99.5 | 330 | 48,000 |
| 4 | $MgO/ZrO_2/1ZMnO$ | 1400° C./ 2 hrs. | 97.8 | 246 | 35,000 |
| 5 | $Mg/ZrO_2/2ZMnO$ | 1400° C./ 2 hrs. | 98.0 | 298 | 43,000 |

Samples 1, 2 and 3 all were prepared with a center layer which contained stabilized zirconia, as indicated by (s). Samples 1, 4 and 5 were prepared from Zircar brand zirconia while Samples 2 and 3 contained Daiichi zirconia. Sample 2 was dry pressed prior to sintering.

Samples 1 through 3, which have surface compressive layers, generally show some enhancement in strength over samples 4 and 5, which are toughened magnesia bars containing MnO as a sintering aid.

In Table 3, strength and density data on hot-pressed magnesia compositions are tabulated.

TABLE 3

Bending Strength of Hot-Pressed MgO—$ZrO_2$ Ceramics

| Sample | Composition | Process | Relative Density | Strength MPa | (psi) |
|---|---|---|---|---|---|
| 1 | MgO | 1400° C./4000 psi/10 min. | 99.6 | 212 | 31,000 |
| 2 | MgO + 20% $ZrO_2$ | 1300° C./4000 psi/10 min. | 99.0 | 360 | 52,000 |
| 3 | Layered MgO + 20% $ZrO_2$ MgO + 20% $ZrO_2$* | 1300° C./4000 psi/10 min. | 99.6 | 446 | 64,000 |
| 4 | Layered MgO + 20% $ZrO_2$ $^A$ MgO + 20% $ZrO_2$ $^M$ | 1300° C./4000 psi/10 min. | 99.0 | 526 | 76,000 |
| 5 | MgO + 20% $ZrO_2^{\#}$ | 1300° C./3500 psi/10 min. | 99.5 | 320 | 46,000 |
| 6 | Layered MgO + 20% $ZrO_2^{\#}$ MgO + 20% $ZrO_2^{\Delta}$ | 1300° C./3500 psi/10 min. | 99.6 | 488 | 71,000 |

TABLE 3-continued

| | Bending Strength of Hot-Pressed MgO—ZrO$_2$ Ceramics | | | | |
| | | | Relative | Strength | |
| Sample | Composition | Process | Density | MPa | (psi) |
|---|---|---|---|---|---|
| 7 | MgO + 40% ZrO$_2$ | 1400° C./3500 psi/20 min. | 98.0 | 483 | 70,000 |

ZrO$_2$* - Zircar
ZrO$_2$# - Daiichi
ZrO$_2$ - Harshaw
ZrO$_2$$^\Delta$ - CaO stabilized
ZrO$_2$ $^A$ - Harshaw, annealed
ZrO$_2$ $^M$ - Harshaw, milled In the above table, it may be observed that layered samples generally exhibited greater strength than non-layered samples of similar compositions when similarly processed; for example, Sample 6 exhibited a strength significantly greater than that of Sample 5.

The instant invention works particularly well when applied to magnesia ceramic bodies, which typically have low strength in comparison to other conventional ceramic bodies. However, layered magnesia composites prepared to have at least one layer in which no significant crystal size changes occur during sintering, either during heating or cooling, exhibit outstanding strength.

Layered magnesia components may be readily processed by conventional sintering techniques whenever a minor amount, for example, less than 5% and especially less than 2% by weight, of manganese oxide is included in the composition. Other sintering aids such as iron oxide may also be utilized. In copending application Ser. No. 792,479 of Virkar, et al. filed on the same date as the instant application, there is a full disclosure of processes and techniques for enhancing the sinterability of magnesia, the disclosure of said application being incorporated herein by reference.

The sintering aids particularly useful are metal oxides having the formula $AO_x$ wherein A is a metal having a valence greater than two and x is a number having a value greater than one-half the valence state of A. Useful sintering aids are chromium oxide and aluminum oxide and the like, in addition to manganese oxide and iron oxide which are especially effective, with manganese oxide being preferred.

Either by varying chemical composition, especially varying concentration of stabilizing agent present, or by varying particle size of transformation agent present, ceramic bodies having a plurality of stress zones of various thicknesses may be readily formed. Either technique can be utilized to produce ceramic bodies having surface compression zones and internal stress zones, or vice versa, if desired.

The techniques of the instant invention are particularly useful in many respects. First, the number, depth and location of either compressive or tensile stress zones can be readily controlled. Second, the ceramic body in the green state is an accurate gauge of the characteristics of the stressed sintered body. In the green state, a ceramic article can be examined chemically to determine the stabilizing agent location and concentration gradient, or examined physically, e.g. by optical or x-ray microscopy, to determine the location and concentration gradient of very fine particles capable of crystal phase transformation.

I claim:

1. A green ceramic body having at least two compositional zones comprising:

a first substantially continuous compositional layer composed at least in part of sinterable particles of magnesia; and a second substantially continuous compositional layer substantially coextensive and contiguous with said first layer, said second layer composed at least in part of sinterable magnesia particles wherein at least a portion of the ceramic particles in said second layer are of a composition different from that of the first layer whereby the particles of the second layer, upon sintering and cooling, tend to assume a greater bulk volume than the particles of the first layer, thereby occasioning a compressive stress in said second layer and a tensile stress in said first layer, and said first and second layers contain a sintering aid selected from the class of metal oxides.

2. The green ceramic body of claim 1 wherein said first layer is interposed between two second layers.

3. The green ceramic body of claim 1 wherein the composition difference between said first and second layers is a chemical compositional difference.

4. The green ceramic body of claim 1 wherein the composition difference between said first and second layers is a particle size difference in certain particles susceptible to a phase transformation.

5. The green ceramic body of claim 3 wherein a significant portion of the sinterable particles of said second layer have the same chemical composition as the particles of said first layer.

6. The green ceramic body of claim 1 wherein said body is a solid rod, a flat plate, or a hollow tube.

7. The green ceramic body of claim 1 wherein said second layer contains zirconia or hafnia particles of a crystal phase susceptible of transformation to a crystal phase having a larger volume.

8. A sintered magnesia ceramic body consisting of two contiguous, coextensive stress layers with each layer having a common interface with the other and with each layer having a surface which is an external surface of the body, one of said layers being in compression and the other layer in tension.

9. A sintered magnesia ceramic body having more than two contiguous, coextensive stress layers with each layer having a common interface with another layer and two layers having surfaces which are external surfaces wherein at least one of said layers is in compression and at least one of said layers is in tension.

10. A method of forming a sintered ceramic body having at least one compressive stress zone and at least one tensile stress zone comprising:

forming a first layer of sinterable particles of a certain composition of which at least a portion of said particles are sinterable magnesia;

forming a seond layer of sinterable particles of a composition different than that of said first layer, wherein said second layer contains at least a significant volume of particles susceptible of undergoing a volumatic change upon being subjected to a transformation temperature, having at least one surface of said second layer coextensive and contiguous with a surface of said first layer, whereby said second layer of particles, upon sintering, has a different bulk density (or volume) than that of said first layer;

forming a green body of said first and second layers; and sintering said green body of first and second layers.

11. The process of claim 10 wherein at least a significant portion of the sinterable particles in said second layer has the same composition as the particles of said first layer.

12. The process of claim 10 wherein the sinterable particles of said first layer are of substantially the same composition.

13. The process of claim 10 wherein said first layer comprises sinterable particles of alumina of which at least a portion of said particles are sinterable magnesia.

14. The process of claim 13 wherein said second layer has substantially the same composition as said first layer plus zirconia or hafnia particles susceptible of phase transformation to a phase having an increased volume.

15. The process of claim 10 wherein one said layer is in substantial contact with two of said other layers.

16. A process for forming a sintered ceramic body having at least one compressive stress zone and at least one tensile stress zone comprising:

forming a first layer of sinterable ceramic particles of a composition which undergoes no crystal phase change over a temperature range of about room temperature to the sintering temperature of said particles, wherein at least a portion of said particles are sinterable magnesia; forming in contact with a surface of said first layer a second layer of sinterable ceramic particles having therein at least a minor portion of ceramic particles which are of a composition which form more than one crystal phase over a temperature range of about room temperature to about the sintering temperature of same, whereby a crystal phase formed upon cooling of said sintered particles to room temperature has a bulk volume which is substantially different from the bulk volume of another phase existing at a temperature significantly above room temperature;

forming a green body of said first and second layers;

sintering said green body to form a sintered body; and cooling said sintered body at a rate such that crystals in said second layer transform to a different crystal structure occupying a different volume than the predecessor crystals.

17. The process of claim 16 wherein said composition of said second layer is of a different chemical composition than the first layer whereby said first layer contains a chemical ingredient which retards crystal phase change of certain components within said composition of said first layer.

18. The process of claim 16 wherein said composition of said second layer is of a different physical composition than said first layer whereby said second layer contains particles having a crystal phase susceptible of transforming to a larger crystal phase, said particles of said second layer being sufficiently larger than the particles of said first layer to obtain phase transformation to a significant extent in said second layer.

19. The process of claim 17 wherein said second layer contains zirconia or hafnia particles susceptible of transformation to a larger crystal form.

* * * * *